United States Patent [19]

Brandt et al.

[11] Patent Number: 4,717,475
[45] Date of Patent: Jan. 5, 1988

[54] APPARATUS FOR SEPARATING WATER AND OIL BY MEANS OF SEPARATE CONTAINERS OF OLEOPHILIC BODIES

[75] Inventors: Robert H. Brandt, Bowling Green; Merlin P. Hoodlebrink, Bradner, both of Ohio

[73] Assignee: Brandt & Associates, Inc., Pemberville, Ohio

[21] Appl. No.: 860,820

[22] Filed: May 8, 1986

[51] Int. Cl.$^4$ ............................................. B01D 23/10
[52] U.S. Cl. ..................................... 210/237; 210/265; 210/282; 210/519; 210/521; 210/536; 210/DIG. 5
[58] Field of Search ................. 210/DIG. 5, 237, 238, 210/255, 257.1, 258, 264, 265, 281, 282, 289, 291, 521, 522, 536, 540, 519

[56] References Cited

U.S. PATENT DOCUMENTS

| 1,629,418 | 5/1927 | Smith | 210/291 |
| 3,558,482 | 1/1971 | De Young | 210/265 |
| 3,618,910 | 11/1971 | Arndt | 261/94 |
| 4,203,843 | 5/1980 | Carlstedt | 210/DIG. 5 |
| 4,246,112 | 1/1981 | Mausgrover | 210/258 |
| 4,333,835 | 6/1982 | Lynch | 210/522 |
| 4,406,793 | 9/1983 | Kruyer | 210/DIG. 5 |

FOREIGN PATENT DOCUMENTS

| 56-2806 | 1/1981 | Japan | 210/282 |
| 57-11682 | 3/1982 | Japan | 210/DIG. 5 |
| 60-84114 | 5/1985 | Japan | 210/255 |

Primary Examiner—Richard V. Fisher
Assistant Examiner—Linda S. Evans
Attorney, Agent, or Firm—Allen D. Gutchess, Jr.

[57] ABSTRACT

Apparatus is provided for separating liquids and particularly water and oil. The separating apparatus includes a tank containing two coalescent cells or units, one of which receives the liquids directly from a supply pipe and immediately disperses the liquids through a perforate recess into the cell. The liquids are partly separated in that cell and further in the second cell. Oil is separated from the top of the tank into a separate chamber and water is separated from the bottom into another chamber from which it is discharged and can be recirculated. The cells, which contain bodies with a high surface-to-weight ratio and are made of a material having an affinity for oil, are readily removable from the system for cleaning or replacement of the bodies.

6 Claims, 8 Drawing Figures

APPARATUS FOR SEPARATING WATER AND OIL BY MEANS OF SEPARATE CONTAINERS OF OLEOPHILIC BODIES

This invention relates to a system for separating two liquids from one another, and specifically water and oil.

The separating system according to the invention comprises a tank in which are coalescent cells or units which separate the oil from the water. The oil is withdrawn from the top of the tank into a first separate chamber while the water is separated from the bottom of the tank into a second separate chamber from which it is discharged an can be recirculated.

The coalescent cells or units are locted in side-by-side relationship in the tank and the first cell has a side recess receiving a supply pipe which directs the water-oil into the tank. This first cell quickly disperses the water-oil combination through the cell and partly separates the oil from the water. The second cell substantially completes the separation of the water and oil. Each of the cells is in the shape of a rectangular parallelepiped with walls having openings therein through which the water-oil can flow with minimal resistance. The cells contain bodies of an oleophilic material having a high surface-to-weight ratio and having maximum dimensions ranging from about one inch to three inches. The oil coalesces on these bodies, forming droplets which increase in size and float to the surface. The oil then flows through an upper opening in the tank into the first separate chamber from which it can be withdrawn. The water is directed through a lower opening under a partition and into the second chamber from which it can be discharged through a discharge opening over an adjustable overflow panel.

The coalescent cells have handles extending upwardly therefrom with the cells being positioed in the tank such that the tops of the cells are below the liquid level therein and the handles extend above the liquid level. The area above the top of the tank is unobstructed so that the cells can be readily removed by means of the handles for cleaning or replacement of the coalescent bodies therein.

It is, therefore, a principal object of the invention to provide a system for more effectively separating liquids, such as water and oil, from one another.

Another object of the invention is to provide an oil-water separating system having individual, removable coalescent cells or units.

Many other objects and advantages of the invention will be apparent from the following detailed description of a preferred embodiment thereof, reference being made to the accompanying drawings, in which.

Figure 1:
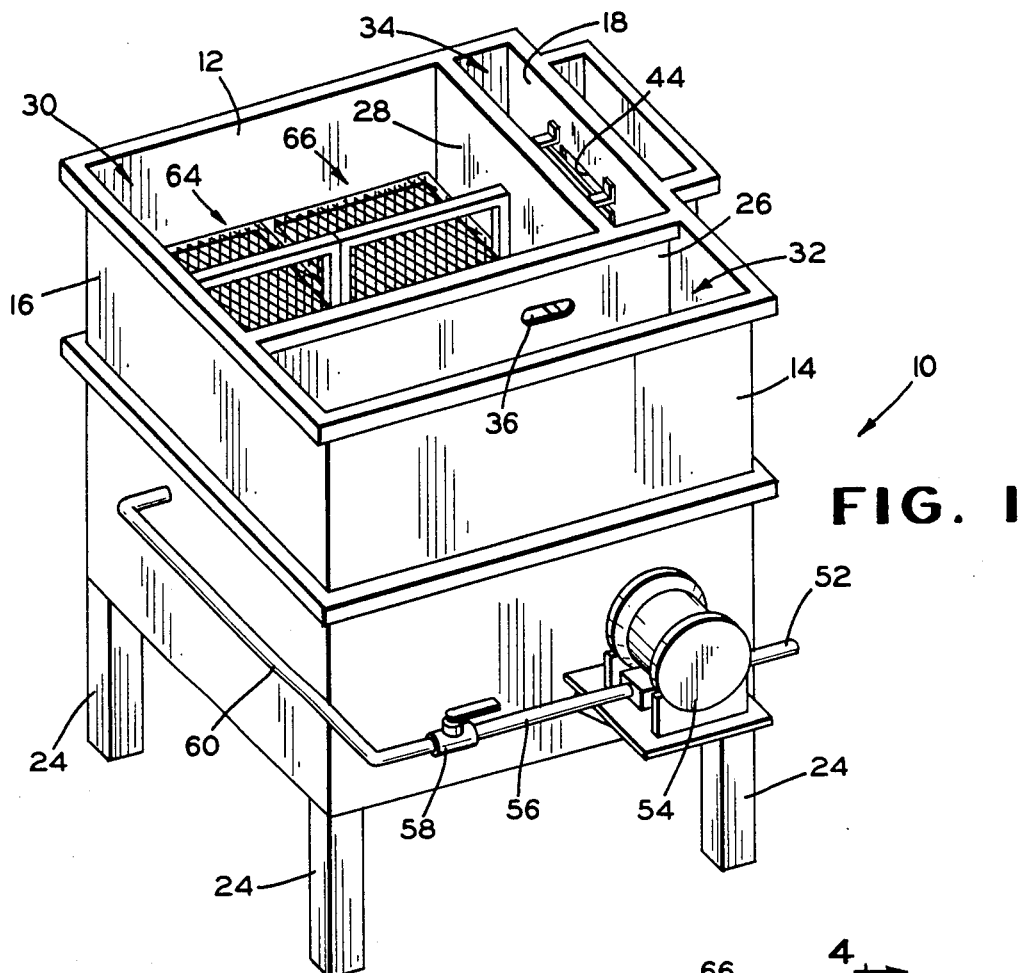
FIG. 1 is a somewhat schematic view in perspective of liquidseparating apparatus in accordance with the invention.

Referring to the drawings, liquid-separating apparatus indicated at 10 is commonly used to separate oil and water. The liquid supplied to the apparatus can be received from a washer which cleans oil-coated parts after a machining operation, by way of example. In such an instance, the liquid can be withdrawn from the washer by means of a pump and float assembly or skimmer at the top of the liquid therein. This method can also be used for skimming oil from coolant systems. The liquid can also come from a coolant system for supplying coolant to metal-working machines which perform cutting, drilling, etc. operations on metal parts in the above manner or from the coolant header system in which the coolant is under pressure. The amount of oil relative to the amount of water can vary from a small percentage to a substantial one, depending upon the particular application.

The apparatus 10 includes two side walls 12 and 14 and two end walls 16 and 18 with slanted bottom walls 20 and 22 mounted on legs 24. A partition 26 extends between the end walls 16 and 18 and a baffle 28 extends between the side wall 12 and the partition 26.

A main tank 30 is formed in the apparatus 10 by the side wall 12, the end wall 16, the bottom wall 20, the partition 26, and the baffle 28. A first liquid or oil chamber 32 is formed alongside the tank 30 by the partition 26, the side wall 14, the end walls 16 and 18, and the bottom wall 22. A second liquid or water chamber 34 is formed beyond the end of the tank 30 by the baffle 28, the partition 26, the side wall 12, the end wall 18, and the bottom wall 20.

The first liquid- or oil-receiving chamber 32 communicates with the tank 30 through an upper opening or slot 36 (FIGS. 1–4) in the partition 26 while the second liquid- or water-receiving chamber 34 communicates with the tank 30 through a lower elongate opening 38 formed between the bottom wall 20 and a lower, slanted edge 40 of the baffle 28. Oil floating on water in the tank 30 can thus overflow through the slot 36 into the chamber 32. This oil can then be periodically removed through a discharge pipe 42 located in the bottom of the chamber 32 in the end wall 18. Water in the chamber 34 is discharged substantially continuously through an upper elongate discharge opening or slot 44 which is adjustable and will be discussed in more detail subsequently. The water is received in a discharge receptacle 46 mounted on the end wall 18 of the tank and flows downwardly through a discharge pipe 48. The water can be recirculated to the parts washer or machine coolant system or other application, if desired. Solid pollutants can be occasionally drained from the bottom of the chamber 34 through a discharge pipe 50 in the end wall 18.

The liquids to be separated are supplied through an inlet line 52 to a pump 54 mounted on the side of the apparatus. The pump is preferably of an air-operated diaphragm type which is commercially available. This type of pump minimizes further mixing or homogenizing of the liquids which are to be separated. From the pump, the liquids flow through an outlet line 56 and a manually-operated, flow control valve 58 to a supply pipe 60. At the end wall 16, the pipe 60 communicates with a supply nipple or extension 62 (FIG. 2) extending into an end of the tank 30.

Figure 6:
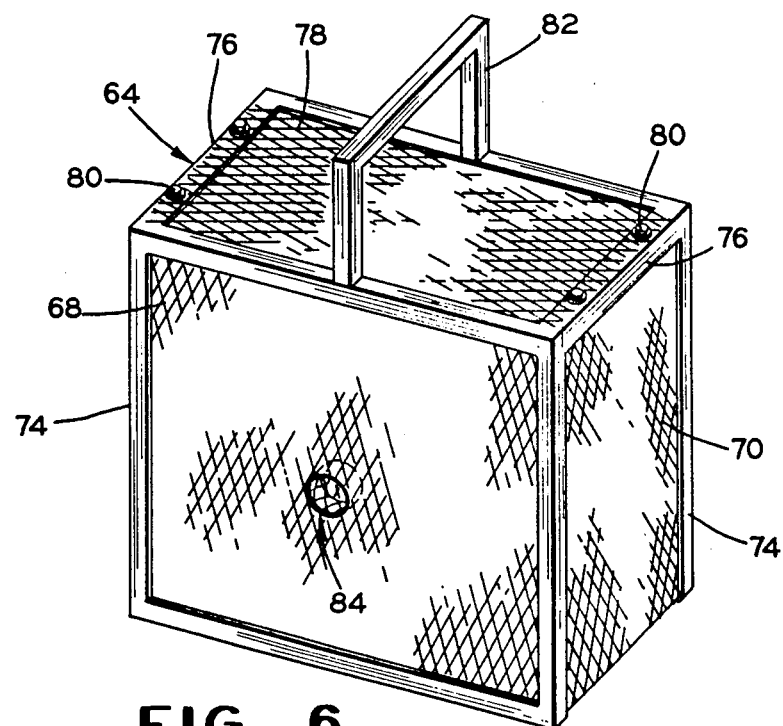
FIG. 6 is a further enlarged view in persepctive of the first coalescent cell.

The liquids then enter a first coalescent unit or cell 64 which is located in the supply end of the tank 30 and is in side-by-side relationship with a second coalescent unit or cell 66. Each of the cells 64 and 66 is an enclosed container and has front and rear walls 68, side walls 70, and a bottom wall 72. The walls are affixed to and supported by square frame members 74 and cross frame members 76. Removable top walls 78 are affixed to the cross frame members 76 by fasteners 80 (FIG. 6). The walls are preferably made of expanded metal or other material having large open areas relative to the solid areas of the walls so as to minimize resistance of flow of liquids therethrough. Inverted U-shaped handles 82 are affixed to middle portions of the tops of the square frame members 74 and extend upwardly therefrom.

Figure 2:
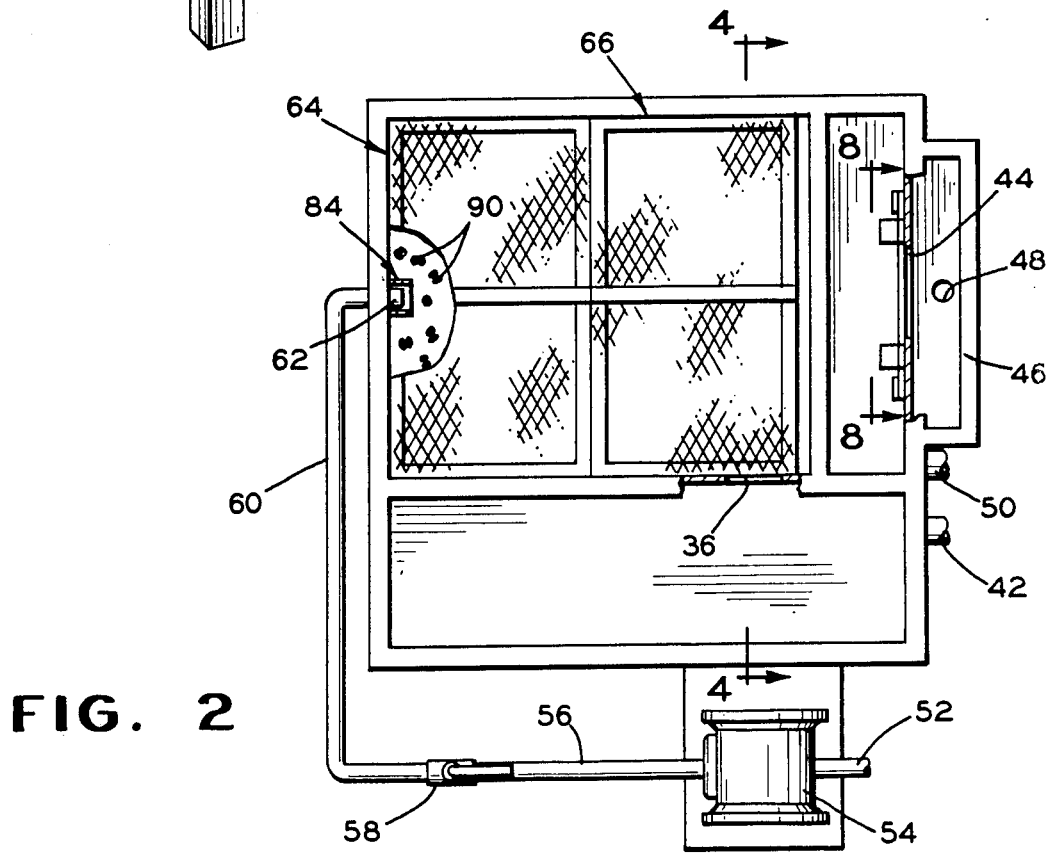
FIG. 2 is a plan view of the apparatus shown in FIG. 1, with parts broken away.
Figure 3:
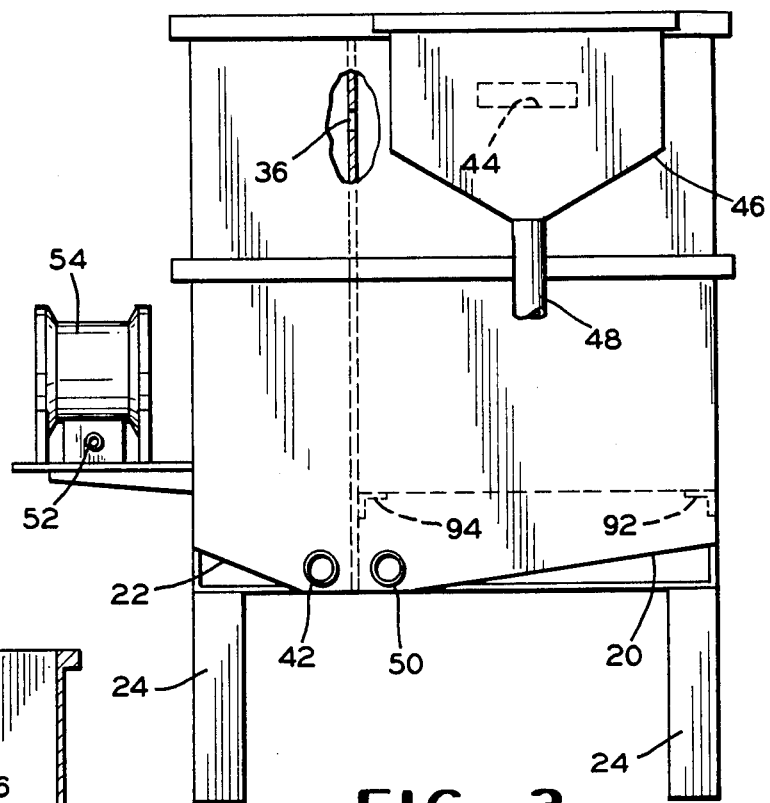
FIG. 3 is an end view in elevation of the apparatus.
Figure 7:
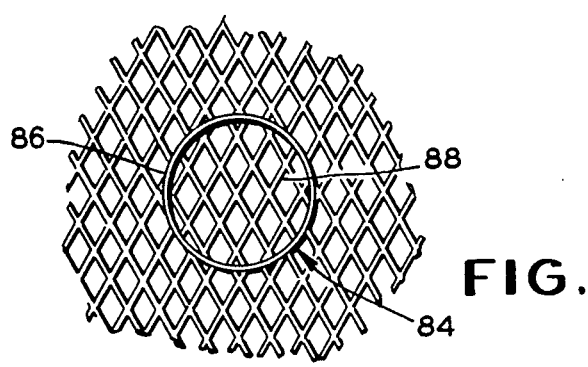
FIG. 7 is a further enlarged view in elevation of a portion of the coalescent cell of FIG. 6.
Figure 8:
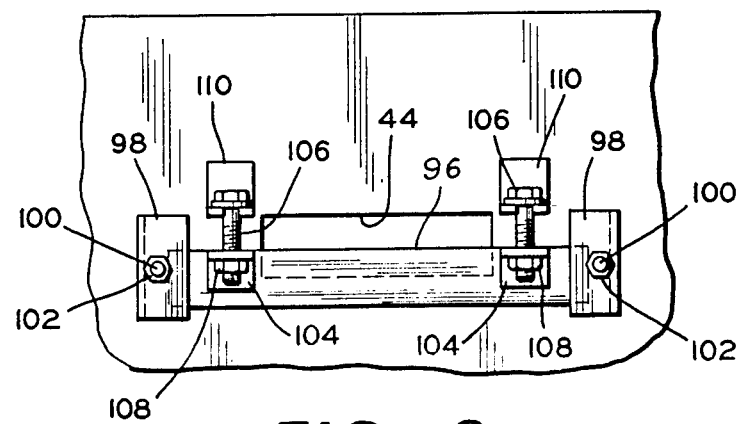
FIG. 8 is a fragmentary view of the apparatus showing an adjustable overflow control.

The first coalescent cell 64 has a recessed, perforate inlet 84 in a central portion of the front wall 68 into which the supply nipple 62 extends (FIGS. 2). The recessed inlet 84 is also made of expanded metal or the like and comprises a cylindrical extension 86 (FIG. 7) and a circular inner end wall 88. This arrangement of the supply nipple 62 and the recessed inlet 84 enables the supplied liquids to be immediately dispersed upon entering the first coalescent cell 64 so that the oil and water can be more effectively separated sooner. Partial separation of the oil and water takes place in the first cell 64 with additional separation then occuring in the second, side-by-side cell 66.

The coalescent cells, in this instance, each measure two feet by two feet by one foot, providing eight cubic feet in the tank 30. The cells contain oleophilic bodies 90 which have an affinity for oil. The oil collects on the bodies 90 in droplets and, when the droplets increase sufficiently in size, they float to the surface of the liquids in the tank 30. The bodies 90 are preferably made of polypropylene which is preferentially wetted with oil in the presence of an oil-water mixture and has a specific gravity in the order of 1.0 and preferably from 0.85 to 1.15. The bodies 90 physically have a very high surface-to-weight ratio and have maximum dimensions from about one inch to about three inches. The bodies are shaped such that they will not nest together nor nest in a manner such as to cause channelization of the liquids through the bodies in the cells. The preferred bodies are made by Heil Process Equipment Corporation of Cleveland Ohio under the name "Heilex" packing and are also shown in U.S. Pat. No. 3,618,910, issued Nov. 9, 1971. Other suitable bodies are available from Norton Chemical Process Products of Akron Ohio under the names "Pall" rings and "Super Intalox" saddles. Heretofore, all of these bodies have only been used as tower packing for gasses and liquid.

Figure 4:
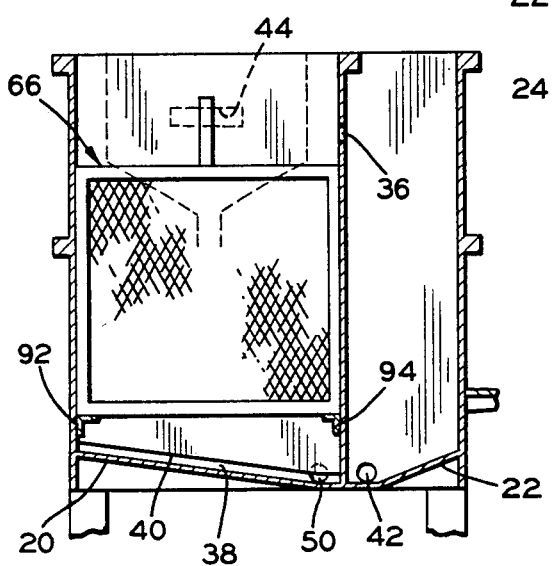
FIG. 4 is a smaller view in transverse cross section taken along the line 4—4 of FIG. 2.
Figure 5:
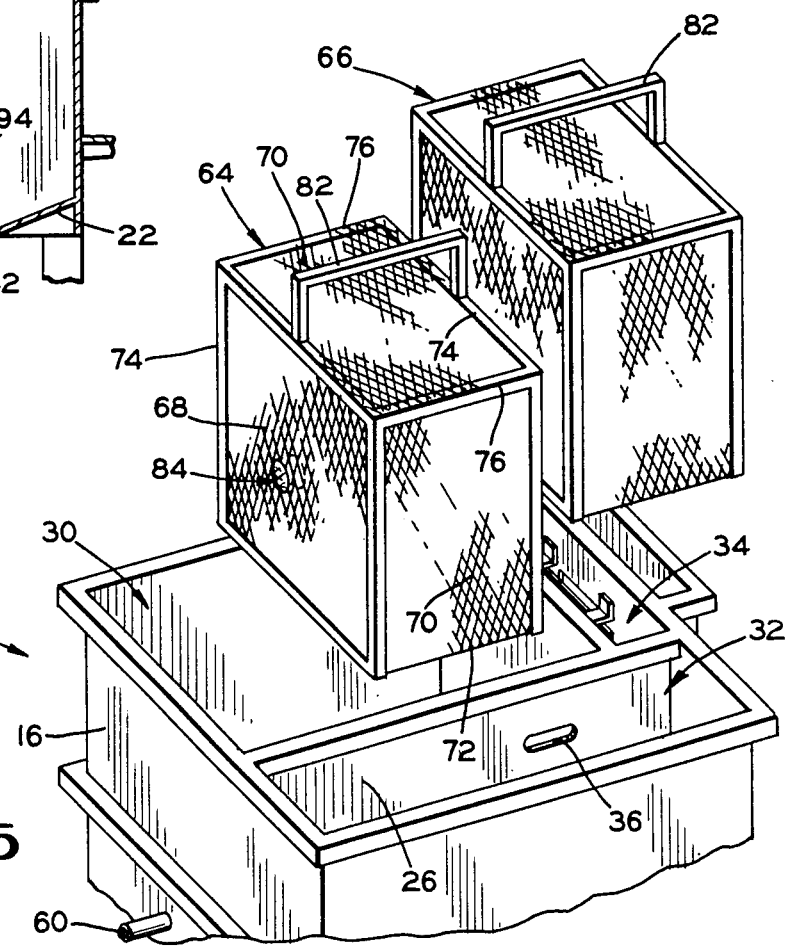
FIG. 5 is a fragmentary view in perspective of the apparatus and two coalescent cells lifted therefrom.

The cells 64 and 66 are removably supported in the tank 30 above the bottom wall 20 thereof by supports or bars 92 and 94 (FIG. 4). The tank 30 is unobstructed above the cells 64 and 66 so that they can be readily removed from the tank by means of the handles 82. To remove the cells, the second cell 66 is first removed by lifting upwardly and the first cell is then moved toward the baffle 28 to clear the supply nipple 62, after which it is also lifted directly upwardly from the tank. The top walls 78 of the cells can be removed so that the bodies 90 can be removed for more thorough cleaning or replacement. Most of the time, however, it is sufficient merely to place the cells 64 and 66 in a cleaning solution, such as in a parts washer, for cleaning purposes.

The level of the water in the second chamber 34 is determined by an adjustable overflow panel or plate 96 which partially obstructs the discharge opening 44. The level of the water in the chamber 34 is controlled so that the level of the water in the tank 30 will be below the upper slot in the partition 26 and the level of the oil on the water in the tank 30 will not exceed the top of the slot 36 in the partition. The combined level of the water and oil in the tank 30, of course, will be higher than the level of the water in the second chamber 34. The level of the water and oil in the tank 30 is also below the upper extremities of the handles 82 so that the cells 64 and 66 can be removed without the necessity of the operator immersing his hand in the liquids.

For adjustment purposes, the panel 96 is held against the inner surface of the end wall 18 by clamping plates 98 held by studs 100 which are suitably affixed to the end wall. The clamping plates 98 clamp the panel 96 against the end wall when nuts 102 are tightened on the studs 100. The adjustable panel 96 has angled brackets affixed thereto and extending outwardly therefrom with openings through which adjusting bolts 106 extend, with the shanks of the bolts being threaded through nuts 108 affixed, as by welding, to the brackets 104. The bolts 106 are rotatably supported by supporting brackets 110 affixed to the end wall 18 above the discharge opening 44. When the bolt heads are turned clockwise, the bolts 106 are threaded further through the nuts 108 and raise the overflow panel 96 to thereby raise the level of water in the chamber 34. The nuts 102 are loosened before adjustment is made to enable the panel 96 to move up and down relative to the end wall 18.

In operation, by way of illustration, the apparatus as described has a capacity of ten gallons per minute and can accommodate a washer or a holding system for coolant for a number of metal-working machines having a capacity of 25,000 gallons. With a flow rate of ten gallons per minute, the liquids flow through the apparatus from the supply pipe 60 to the adjustable discharge opening 44 in about ten minutes.

From the above, it will be seen that the liquid-separating apparatus according to the invention is relatively simple and maintenance free. At the same time, occasional maintenance of the oleophilic bodies 90 is easy to accomplish by the employment of the coalescent cells 64 and 66. The ease of cleanability of the bodies through the use of the cells also enables the separating unit to maintain high efficiency.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. Separating apparatus for separating water and oil comprising tank wall means forming a main tank having an end wall, a supply pipe for supplying water and oil to be separated, said supply pipe having an extension projecting into said tank through a central portion of the end wall of said tank, a first coalescent unit comprising unit wall means forming an enclosed container having front, rear, side, bottom, and top walls, said container walls having means defining a multiplicity of openings to minimize resistance to the flow of liquids therethrough, means forming a perforate recess extending into said container at an intermediate portion of said front wall to receive the extension of said supply pipe which projects into said tank, the depth of said perforate recess exceeding the length of said extension of said supply pipe, a second coalescent unit comprising second unit wall means forming a second enclosed container having second front, rear, side, bottom, and top walls, said second walls having means defining a multiplicity of openings therein to minimize resistance to flow of liquids therethrough, a multiplicity of oleophilic bodies in each of said first and second coalescent units, said bodies being of the same shape with the shape being such that said bodies will not nest together nor nest in a manner to cause channelization of the liquids through said units, support means supporting said first coalescent unit in said tank with the front wall thereof adjacent the end wall of said tank through which said supply pipe extension projects, whereby water and oil supplied through said supply pipe and said extension are dispersed immediately when entering said first coalescent unit, said support means also supporting said second coalescent unit in said tank in side-by-side relationship with repsect to said first coalescent unit and with said front wall of said second coalescent unit adjacent said rear wall of said first coalescent unit, said tank wall means forming an upper opening in an upper portion of said tank above the top walls of said coalescent units, through which opening oil can flow, said tank wall means forming a lower opening through which water can flow, said lower opening being below said first and second coalescent units, chamber wall means forming a chamber receiving water through said lower opening, said chamber wall means forming a discharge opening at an upper level in said chamber from which water in said chamber can be discharged, an adjustable flow control panel, means mounting said flow control panel adjacent a lower portion of said discharge opening, and adjustment means for raising and lowering said flow control panel relative to said discharge opening to change the level of the water in said chamber.

2. Separating apparatus according to claim 1 wherein each of said containers has a handle extending upwardly therefrom and above the level of the oil and water in said tank.

3. Separating apparatus according to claim 1 wherein said coalescent units have fastener means removably attaching the top walls to upper edge portions of the front, rear, and side walls.

4. Separating apparatus according to claim 1 wherein said oleophilic bodies are made of polypropylene material having a specific gravity between 0.85 and 1.15.

5. Separating apparatus according to claim 1 wherein said pipe extension is cylindrical, and said means forming said perforate recess comprises a perforate wall of a diameter larger than the diameter of said pipe extension and an end wall closing off said perforate cylindrical wall.

6. Separating apparatus for separating water and oil comprising tank wall means forming a main tank having an end wall, a supply pipe for supplying liquids to be separated, said supply pipe having an extension projecting into said tank through a central portion of the end wall of said tank, a first coalescent unit comprising unit wall means forming an enclosed container with means defining a multiplicity of openings therein to minimize resistance to the flow of liquids therethrough, a second coalescent unit having unit wall means forming a second enclosed container with means defining a multiplicity of openings therein to minimize resistance to flow of liquids therethrough, means forming a perforate recess extending into said first container at an intermediate portion of a wall thereof to receive the extension of said supply pipe which projects into said tank, the depth of said perforate recess exceeding the length of said extension of said supply pipe, a multiplicity of oleophilic bodies in each of said first and second containers, support means supporting said first coalescent unit in said tank with said wall thereof adjacent the end wall of said tank through which said supply pipe extension projects, whereby water and oil supplied through said supply pipe and said extension are dispersed immediately when entering said first coalescent unit, said support means also supporting said second coalescent unit in said tank in side-by-side relationship with respect to said first coalescent unit and with a wall of said second coalescent unit adjacent a wall of said first coalescent unit, said tank wall means forming an upper opening in an upper portion through which oil can flow, said tank wall means forming a lower opening through which water can flow, chamber wall means forming a chamber receiving water through said lower opening, said chamber wall means forming a discharge opening at an upper level in said chamber from which water in said chamber can be discharged, each of said containers having a handle extending upwardly therefrom and above the level of the oil and water in said tank, said hanldes enabling said containers to be removed individually from said tank.

* * * * *